Figure 1:
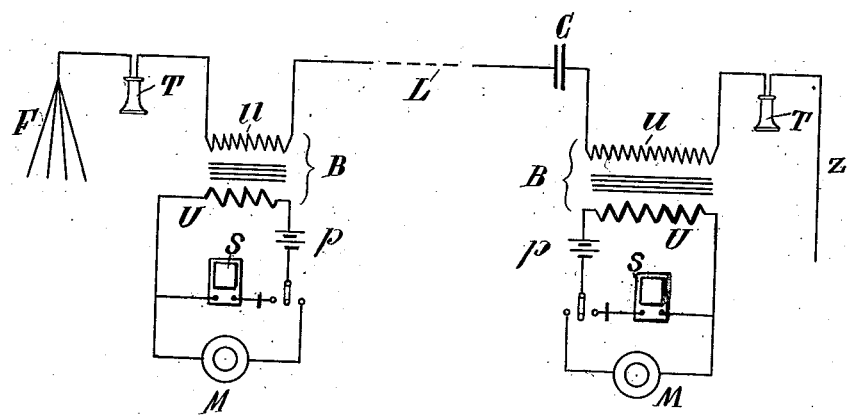

C. BARDELONI.
METHOD OF TELEPHONIC TRANSMISSION WITHOUT RETURN WIRE.
APPLICATION FILED MAY 28, 1915.

1,287,180.

Patented Dec. 10, 1918.
2 SHEETS—SHEET 1.

INVENTOR:
Cesare Bardeloni
By Wm Wallace White
ATT'Y.

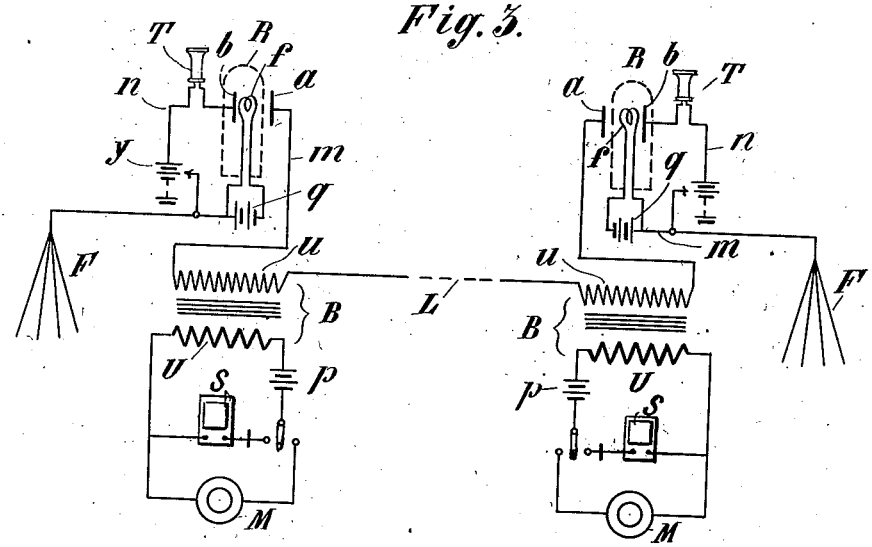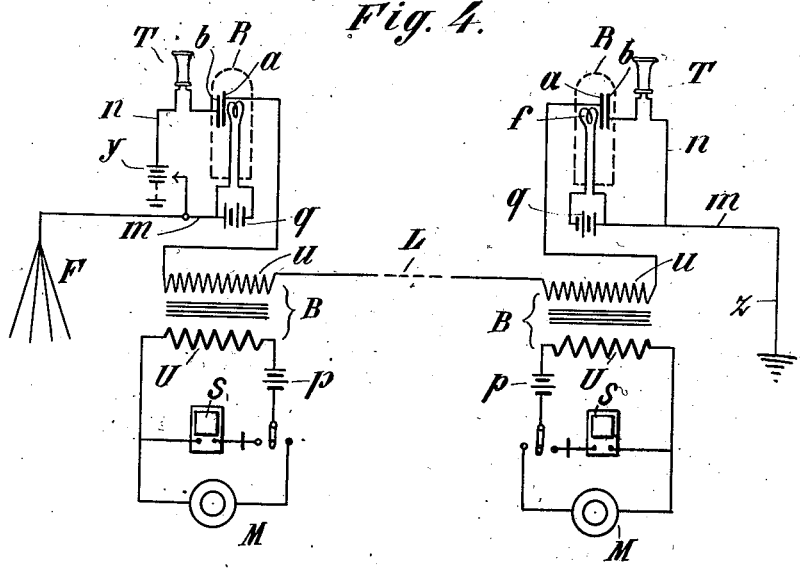

UNITED STATES PATENT OFFICE.

CESARE BARDELONI, OF ROME, ITALY.

METHOD OF TELEPHONIC TRANSMISSION WITHOUT RETURN-WIRE.

1,287,180.  Specification of Letters Patent.  Patented Dec. 10, 1918.

Application filed May 28, 1915. Serial No. 30,898.

*To all whom it may concern:*

Be it known that I, CESARE BARDELONI, engineer, a subject of the King of Italy, residing at Rome, in the Kingdom of Italy, have invented certain new and useful Improvements in the Methods of Telephonic Transmission Without Return-Wire, of which the following is a full, clear, and exact description, such as will enable others skilled in the art to which it appertains to make and use the same.

The telephonic transmission is usually performed upon a closed circuit formed by two conductors which connect the two stations communicating between each other, said two conductors being two wires insulated between each other, one of which may be substituted by the ground allowing the return current to pass through it, in which case the sole metal conductor must have both of its ends earthed in order to secure the closing of the circuit. However, in some cases it may be necessary, or convenient, to avail one's self for the telephonic transmission of a single conductor without earthing its ends. In these conditions the circuit does not close by conductivity and one may, therefore, say that it remains open, with the expression "open circuit" being meant a circuit formed by one or more metal conductor sections electrostatically or electromagnetically connected between each other in such a way as to permit in the whole system the propagation of a variation of the electrical or magnetical state suitably produced in a point of the system, although the extremities of the end sections be connected between each other neither directly nor by means of metal conductors nor through the ground.

The present invention has just the object of utilizing for the telephonic transmission the variations of the electrostatical and electromagnetical conditions, which by any means whatever may be produced in circuits of this kind, producing them for instance by the aid of the transformer of the transmitting microphone, the primary winding of which belongs to a circuit comprising a source of electricity, while the secondary winding belongs to the open transmitting circuit, which has thus to comprise the windings of the receiving telephone, these being inserted upon one of the metal portions composing the circuit; and it is obvious that it is not strictly necessary that the receiving telephone belongs directly to one of the conductors which form the open transmitting circuit, since for the end aimed at it is sufficient that it be coupled to the latter electrostatically or electromagnetically, so as to perceive by inductivity the effects of the variations provoked in the transmitting circuit.

To produce the above mentioned effects, in the practice may be adopted a great many of different arrangements; hereinafter will be disclosed some of them by way of example, having reference to Figures 1 to 4 of the annexed drawing, which shown diagrammatically the arrangement of the circuits and their connections for the cases specified below.

In Fig. 1 —M— represents a transmitting microphone, of any type, in circuit with a primary cell —P—, or with another source of electricity, which by suitable commutations may also be used for controlling an electromagnetic calling device —S— of any kind.

In circuit with the microphone and with the primary cell is the primary winding —U— of the transformer —B—, the secondary winding —u— of which is inserted on the conducting wire —L—.

On the conducting wire is also inserted the receiving telephone —T— having a large number of windings. As this figure, as well as the other ones, shows two complete corresponding stations with transmitter and receiver, on the conducting wire are represented two telephones —T—. The conducting wire may also not throughout consist of metal, and on the same may be inserted a condenser —C—. In this way the transmitting circuit is formed by two portions coupled electrostatically in —C—. The end sections of the conductors forming the circuit may terminate either with an insulated electric counterweight —Z—, formed for instance by the prolongation of the conducting wire itself, or even with a concentrated or subdivided capacity formed, for instance, by a bundle of wires —F—.

Figure 2:
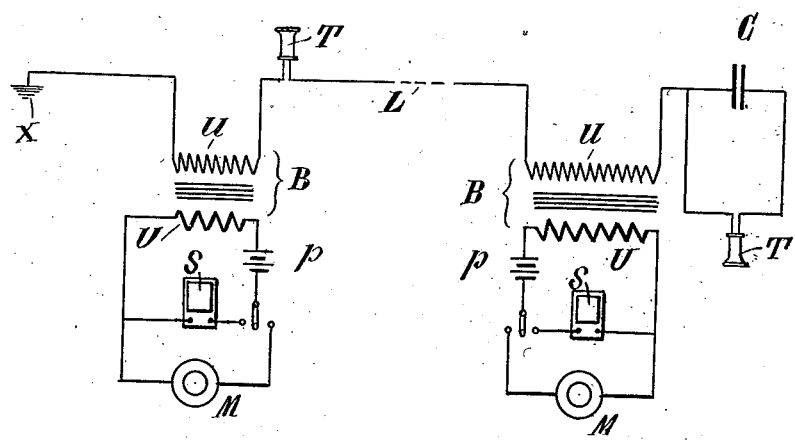

The circuit may also be caused to terminate with one of the earthed ends —x—, and the receiving telephone may be inserted between the plates of the condenser —C—, as shown in Fig. 2.

On the other hand it is unnecessary that the winding of the receiving telephone belongs directly to the conducting wire, since, as already stated, it is sufficient that it forms a portion of a circuit, which is capable of perceiving the influence of the variations in the conditions of the open line circuit. Plants of this kind are shown in Figs. 3 and 4, in which the transmitting apparatus, with the microphone and its connections, is arranged in the same way as indicated by Figs. 1 and 2, while the receiving telephone belongs to a circuit carrying at one extremity the electric counterweight —Z—, or the concentrated or distributed capacity —F—, and tapped off at the other end in two branches, the branch —m— of which comprises a battery feeding an incandescent lamp, the filament —f— of which produces inside the bulb —R— an ionized space, and the other branch —n— comprises the receiving telephone —T— and carries at the free end a metal plate —b—, to which is directed the current of ions which develop from the filament —f—. Upon this current, which manifests itself in the ionized medium, by means of the plate —a— situated at its end acts the current flowing in the line circuit. The plates —a— and —b— may be arranged in any suitable way whatever with respect to the ionized space. One of them may be placed outside and the other inside the bulb —R—, as represented in Fig. 3, or both of them may be located inside, as shown in Fig. 4.

To facilitate the regulation, it may be convenient to insert on branch —n— of the circuit with the ionized space, which comprises the receiving telephone, a battery of primary cells —Y— which by the aid of a switch of its elements permits of the potential of the plate —b— being varied at will, as it is shown in Figs. 3 and 4 on the left.

The system described hereinbefore may be supposed to work in the following way: The displacement current of the electric charges generated on the conducting wire by the induction of the primary winding of the transformer of the transmitting microphone is such that, notwithstanding its weak intensity, it may be perceived in a receiving telephone having a large number of windings and belonging to the conducting wire, or arranged in such a way as to be responsive to the effects of the variability of its electrical conditions. To that end no real return of the current in the circuit of conduction is required, it being sufficient that the stray of the charges which is produced at the ends of the insulated conductor, on which are inserted the corresponding apparatus, may take place either through the ionization of the air or of the space surrounding said ends, or through actual displacement currents which are produced between the ends of the conductor and of the space.

This system, besides the advantages deriving from the possibility of using a sole conductor, even if there is no ground at the two ends, offers also those arising from the very weak intensity of the currents, so that the ohmic resistance of the conductor has no importance whatever. Therefore, this device permits, for instance, the telephonic communication between a captive balloon and the ground by means of the metal mooring rope only, avoiding thus the use of conducting wires contained in the metal rope itself and continuously undergoing tearing or short-circuits, or of wires sustained by the rope and preventing the latter from working.

Of course, the end of the rope wound up on the operating winch, instead of applying to same an electric counterweight, may be earthed, for the purpose of always rendering more important the effects of charge of the conducting wire and, consequently, those exerted on the receiving telephone.

Having thus fully described this my invention and how the same is to be carried out, I declare that what I claim is:—

1. An open circuit telephonic line comprising a transmitter microphone, an induction coil, the primary of said coil being in circuit with said microphone, a receiving telephone, conductors in series with the secondary winding of said coil, other conductors in series with said receiving telephone, ionized spaces between said conductors, and a convenient capacity on one end of said line.

2. An open circuit telephonic line comprising transmitter microphones, induction coils, the primaries of said coils being in circuit with said microphones, receiving telephones, conductors in series with the secondary winding of said coils, other conductors in series with said receiving telephones, ionized spaces between said conductors, a capacity at one end of the line, and a ground connection at the other end.

3. An open circuit telephonic line comprising transmitter microphones, induction coils, the primaries of said coils being in circuit with said microphones, receiving telephones, conductors in series with the secondary winding of said coils, other conductors in series with said receiving telephones, ionized spaces between said conductors, a capacity at one end of the line adapted to be suspended in mid-air by a captive balloon and a ground connection at the other end.

In testimony whereof I affix my signature in presence of two witnesses.

CESARE BARDELONI.

Witnesses:
 LETTERI LABOCIETTA,
 ANTONIO LABOCIETTA.